United States Patent
Tsunoda

[11] 3,891,300
[45] June 24, 1975

[54] APPARATUS FOR MAKING HOLOGRAM
[75] Inventor: Yoshito Tsunoda, Hachioji, Japan
[73] Assignee: Hitachi, Ltd., Japan
[22] Filed: Sept. 5, 1973
[21] Appl. No.: 394,439

[30] Foreign Application Priority Data
Sept. 9, 1972    Japan.............................. 47-90788
Sept. 22, 1972   Japan.............................. 47-94534
Jan. 24, 1973    Japan.............................. 48-9507

[52] U.S. Cl. .......................... 350/3.5; 350/162 SF
[51] Int. Cl. ......................................... G02b 27/38
[58] Field of Search ............ 350/3.5, 162 R, 162 SF

[56] References Cited
UNITED STATES PATENTS
| | | |
|---|---|---|
| 3,515,453 | 6/1970 | Heflinger et al. .................... 350/3.5 |
| 3,604,778 | 9/1971 | Burckhardt.......................... 350/3.5 |
| 3,623,786 | 11/1971 | Dammann et al. .................. 350/3.5 |
| 3,639,033 | 2/1972 | Haines................................. 350/3.5 |
| 3,650,595 | 3/1972 | Gerritsen et al..................... 350/3.5 |

Primary Examiner—John K. Corbin
Attorney, Agent, or Firm—Craig & Antonelli

[57] ABSTRACT

An apparatus for making a hologram comprising a phase shifting plate disposed in the vicinity of a picture analogue information source and composed of a plurality of phase shifting thin layer units having at least two kinds of thicknesses mounted on a transparent substrate irregularly for shifting the phase of information-carrying light.

15 Claims, 11 Drawing Figures

APPARATUS FOR MAKING HOLOGRAM

The present invention relates to an apparatus for making a hologram, and more particularly, to the structure of a phase filter used for the apparatus.

Since a method of recording information on a light sensitive medium by holography has the advantages that (1) a high density recording of information is possible without employing a high resolution optical device, (2) the information storing mechanism has redundancy and is hardly affected by scratches, (3) the reading method is simple and a high speed reading is possible, (4) multiple recording is possible, and (5) both of digital and analogue information can be dealt with, it has drawn attention as a potent means for an optical memory. In the past, studies have been strenuously made on the two-dimensional coding of a light beam to make a hologram for two bits of digital information "1" and "0" by opening and closing a circular hole corresponding thereto. In particular, since the holography using a Fourier transform in which a light sensitive medium on which a hologram is to be made is placed at the position at which the Fourier transform of the pattern had by information-carrying light appears can make the most of the minimum area necessary for recording information, it has the advantages that (1) the diffraction efficiency at the time of reconstruction is high, and (2) the storage density is high. For this reason, it has been widely used. Here, what is to be noticed concerning the holography using the Fourier transform is that generally a Fourier spectrum having a strong peak at the center of a hologram is always produced and that in the case of light information of such a pattern as circular holes arrayed in a matrix form with a constant period, sharp spectral bright spots are often produced at positions other than the center of a hologram. This fact leads to the disadvantages that they saturate the light sensitive medium to produce a noise source, and utilizes only a part of the light sensitive medium to reduce the reproduction efficiency.

To overcome these disadvantages two methods have been considered, one of which is a so-called defocus method in which the light sensitive medium is placed somewhat offset from the Fourier transform plane, and the other of which is a random phase shifter method.

The random phase shifter is a collective name given to device for endowing information-carrying light with a substantially uniform phase throughout the cross-section of each circular hole information and with random separate phases from circular hole information to circular hole information, which are fabricated, for example, by evaporating a transparent dielectric material through a mask having holes arranged at random on a glass plate into $n$ layers, where $n$ is an integer. In this manner a system for making a holographic memory of two-dimensional digital information in which information corresponding to the bits 1 and 0 is arrayed in a matrix form has substantially completed.

The holographic memory has the feature that it can also store analogue information. On the other hand, a social demand is growing for a file of high density analogue information, for example picture information. When the above-described method is applied to a holographic memory of picture information, the following difficulty arises.

The spatial frequency components of ordinary picture information are distributed very widely from a high frequency $f_h$ (lines/mm) of the limit of resolution of human eye to a low frequency $f_l$ (lines/mm) at or around zero such as a white sheet, and moreover the distribution of the spatial frequency components is unstable. Consequently, the prediction of the result of Fourier transformation is very difficult. In particular, in case the components around $f_l$ are large in terms of the energy spectrum, a delta function like very sharp spectrum is produced around the optical axis by the Fourier transformation.

If it is desired to overcome the above difficulty by the afore-mentioned defocus method, the interval between the Fourier transform plane and the light sensitive plane must be made extremely large to much reduce the memory density. The redundancy of the hologram itself is also impaired. In contrast, it is known that the random phase shifter method has a great advantage when combined with a method of sampling picture information. This method utilizes a phase shifting plate which samples picture-information-carrying light by means of a mesh of a periodical array of circular holes to give the sample points a phase distribution which is uniform throughout each sample point but random over individual sample points, i.e. a random phase shifter. By employing this phase shifter, the entire picture information around the zero spatial frequency is forcibly extended in its spatial frequency to the range from 0 to $a/1.22 F\lambda$ (lines/mm), where $2a$ (mm) is the diameter of aperture of the sample point and F is the focal length of a lens for performing Fourier transformation of light passing through picture information to the spatial spectrum plane (hologram plane). By this sampling the information-carrying light is diffused on the hologram on an average and by giving the light random phases the concentration of spectrum produced by a periodic sampling is reduced.

This method was a potent method superior to the conventional picture hologram making method in all points of the quality of image, density, and diffraction efficiency. However, this method also has an important problem.

Ordinarily it is considered to be necessay by taking the resolution of the human eye into account that the pitch of sampling is 0.1 mm or less, but in practice the upper limit of the diameter of an aperture is at most 80 microns for a metallic mesh with a pitch of 0.1 mm. If the diameter is made larger than this limit, there is the danger that the meshes are interlinked.

Consequently, the thickness of the wire of the mesh is 20 microns or more. When a television test pattern as picture information is made into a hologram in its entirety, the size of a side of the picture must be 4 to 5 cm or less from the restriction of the size of the lens. In this case, the width of the strips contained in the picture information is about 20 to 30 microns. Consequently, the line width of the mesh and the strip width of the picture information are comparable, so that so-called Moire fringes are produced by these lines to degrade the quality of the reconstructed or reproduced image.

Accordingly, it is an object of the present invention to provide a random phase shifter useful for removing speckle noise or noise patterns from the hologram.

Another object of the present invention is to provide an apparatus for making a hologram of a high quality, high density, and high diffraction efficiency by utilizing a phase shifting plate.

According to one aspect of the present invention there is provided a phase shifting plate for shifting the phase of picture information-carrying light used for hologram apparatus comprising at least two kinds of unit phase shifting regions having different thickness are distributed irregularly or at random and discontinously with a pitch lower than the resolution of the human eye on a transparent substrate.

According to another aspect of the present invention there is provided an apparatus for making a hologram, comprising a light source for producing a coherent light beam, picture information constructing means including a source of picture information to be recorded, means for directing a part of the light beam to the picture information constructing means, means for causing interference between the output light of the picture information constructing means and another part of the light beam on a light sensitive medium, and a phase shifting plate disposed in the vicinity of the picture information source in which at least two kinds of unit phase-change-giving regions having different thicknesses are distributed irregularly and discontinously with a pitch lower than the resolution of the human eye on a transparent substrate for varying the phase of the output light of the picture information constructing means irregularly.

The above and other objects, features and advantages of the present invention will become more apparent from the following detailed description of the preferred embodiments of the present invention made by way of example only when taken in conjunction with the accompanying drawings, in which.

Figure 1:
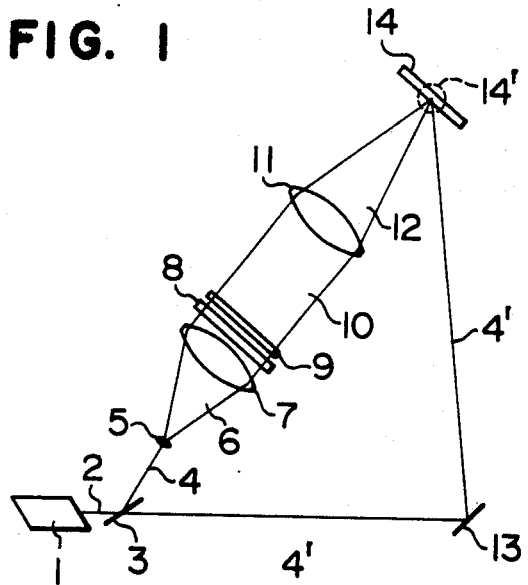
FIG. 1 is a schematic diagram of the overall arrangement for making a hologram according to the present invention.

Referring to FIG. 1 which shows an overall arrangement for making a hologram according to the present invention, a laser beam 2 emitted from a laser source 1 is divided by a beam splitter 3 into an information illuminating beam 4 and a reference beam 4'. The illuminating beam 4 is diverged by a diverging lens 5 to become a diverged beam 6 which in turn is collimated by a collimating lens 7 to illuminate information elements 9. The collimated light pases through a phase shifting plate 8 arranged in front of or behind the information elements 9.

As the information elements 9 a photographic plate may be used, for example. The collimated light which has passed through the information elements 9 and the phase shifting plate 8 and has now become a signal beam 10 carries the information contained in the information elements 9 phase-modulated in accordance with the phase distribution carried by the phase shifting plate 8. An information writing lens 11 converges the signal beam 10 into a converging signal beam 12 to project it on a light sensitive medium 14 as a Fourier transform pattern of the phase modulated picture information. On the Fourier transform pattern is superimposed the reference beam 4' by a mirror 13 to produce intereference fringes between the light beams 12 and 4' to make a hologram 14' on the photographic plate 14.

The thus made hologram is different from an ordinary hologram in that the picture information carried by the signal beam is phase modulated according to the phase distribution of the phase shifting plate 8. This means that the information of the entire picture is sampled with the phase. By the present invention the aforesaid difficulties are overcome and the effects and advantages described hereinbelow are provided.

Since the spatial frequency components of picture information are distributed very widely from a high frequency $f_h$ (lines/mm) of the limit of resolution of human eye to a low frequency $f_l$ (lines/mm) at or around zero such as a white sheet as described above, and since ordinary picture information contains many low frequency components, a spectrum having a very high light intensity around the zero spatial frequency compared with the high frequency region is produced.

Figure 2:
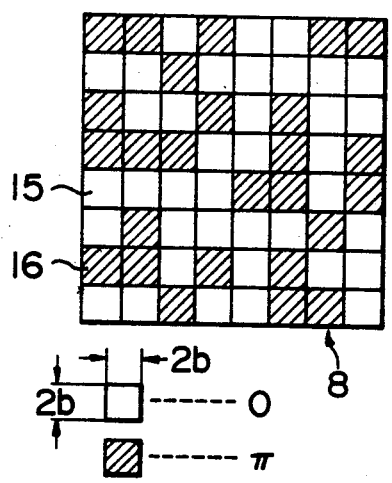
FIG. 2 is a plan view of an embodiment of the phase shifting plate according to the present invention.

Consider now a phase shifting plate having such a phase configuration that periodically arrayed unit patterns are assigned various phases at random. As a unit pattern a pattern having symmetry such as square, rectangle, and circle may be considered, for example. An example of the phase configuration formed of square unit patterns is shown in FIG. 2. In FIG. 2 which is a plan view of the phase shifting plate, shaded or hatched unit regions 16 have such a thickness as just giving the light passing therethrough a phase difference $\pi$, while unshaded or unhatched unit regions 15 have such a thickness as does not substantially give the light passing therethrough any phase changes.

The thicknesses of these two kinds of unit regions change irregularly and discontinuously, that is, they change stepwise at their boundary. Thus, the phase shifting plate has the phase shifting function and the sampling function.

If it is assumed that a side of the square phase giving unit region is $2b$ (mm), the spectrum of the picture information, to be used superimposed on this phase, around the zero spatial frequency is forced to have the spatial frequencies between 0 and $b/F\lambda$ (lines/mm), where F and $\lambda$ are those as defined above. This is mathematically nothing but taking the convolution of the spread Fourier spectrum possessed by the phase shifting plate itself and the Fourier spectrum of the picture information. Thus, by superimposing only the phase shifting plate on the picture information to make a hologram the information is dispersed throughout the hologram on an average to reduce the concentration of the spectrum.

In this case consideration will be given to the effect of the boundary between unit phase patterns arrayed at random, i.e. four sides of each square, on the image reconstructed from the hologram. If the adjacent squares have the same phase, the reconstructed image is no longer affected because the phase is continuous, but if the phases are different, the phases are discontinuous at that boundary. In this case, since the boundary of the phase has very high spatial frequencies, the information at that part is not included in the reconstructed image when the radius of the reconstructed image is finite. As a result, dark lines corresponding to the phase distribution of the phase shifting plate appear in the reconstructed image. However, the width of the dark lines is very narrow (several microns or so), ordinarily far smaller than the fine structure of the picture information. Consequently, in contrast to the production of the Moire fringes, when a mesh is employed, such fringes are never produced in the present invention. There is a further advantage that the reconstructed image is brighter than that when the conventional mesh is employed because the width of the dark lines is very small.

Figure 3:
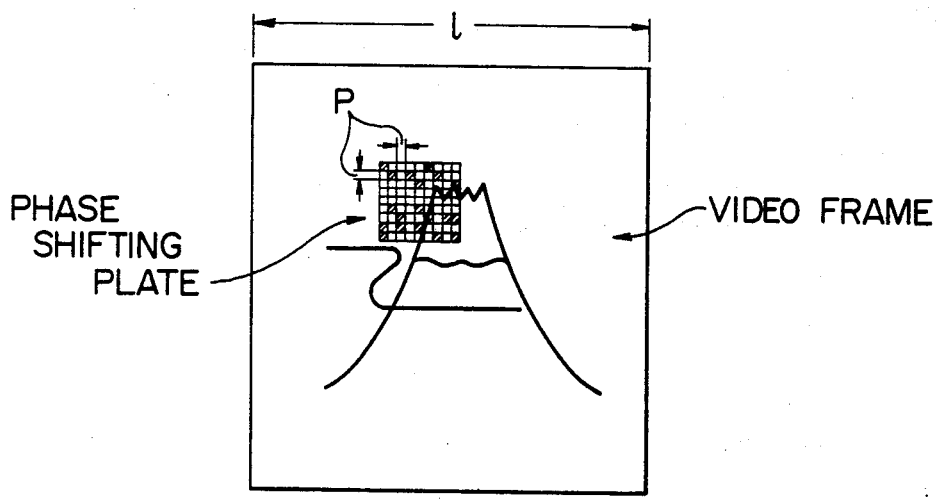
FIG. 3 is a diagram showing the relation between the pitch of the unit regions of the phase shifting plate used in the present invention and the video information or picture.

However, the dark lines in the reconstructed image act as background noise and are often offensive to the eye. In order to overcome this problem, it is sufficient to reduce the side of the unit square of the phase shifting plate, i.e. the pitch of the periodic array lower than the resolution of the eye. Since the resolution of the eye is about 0.1 mm at the distance of distinct vision, a reconstructed image of a high quality can be provided if the pitch of the periodic array of the phase shifting plate is made lower than 0.1 mm for the picture information of rectangles with a longer side of 5 cm because the dark lines are no longer perceived by to the eye. When picture information of a size similar to an ordinary television picture is considered, to obtain an image of a quality similar to that of an ordinary television picture it is sufficient to make the pitch $p$ of the phase shifting plate $p \leq l/500$, where $l$ is the length of the longer side of the picture information, because an ordinary television is sampled at a rate 500 lines per frame. This situation is shown in FIG. 3.

A method of fabricating the phase shifting plate and the effect of specific structures will next be described.

Figure 4:
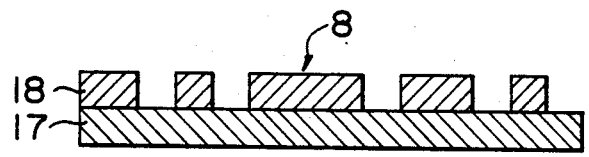
FIGS. 4, 5 and 6 are cross-sections of embodiments of the phase shifting plate according to the present invention.

FIG. 4 is an enlarged cross-section of an embodiment of the phase shifting plate 8 according to the present invention. Transparent materials 18 are mounted at random right on a uniform transparent substrate 17 to such a thickness as produces the phase change $\pi$ as shown in FIG. 2. To fabricate the phase shifting plate 8 the transparent substrate 17 such as a glass plate is overlaid directly with a metal or glass mask having openings correspondingly to the hatched portions of FIG. 2 through which an optically transparent material such as a transparent dielectric material is evaporated or the transparent dielectric material is uniformly evaporated over the surface of the transparent substrate 17 and etched through a mask having openings complimentarily to the hatched pattern of FIG. 2.

Figure 5:
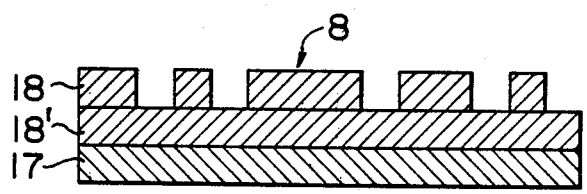

FIG. 5 is a cross-section of another embodiment of the phase shifting plate. The embodiment of FIG. 5 has a uniform transparent layer 18' having the predetermined thickness between the transparent substrate 17 and the transparent material 18 of the embodiment of FIG. 4. It is preferable that the material of the uniform layer 18' is the same as the material 18. When the entire surface of the embodiment of FIG. 5 is illuminated, the unevenness of the intensity distribution of the transmitted light and hence the reconstructed image resulting from the loss due to the multi-reflection by the layer 18, which is caused by the embodiment of FIG. 4, can be eliminated.

Figure 6:
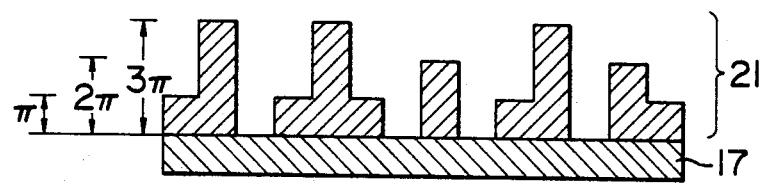
Figure 7:
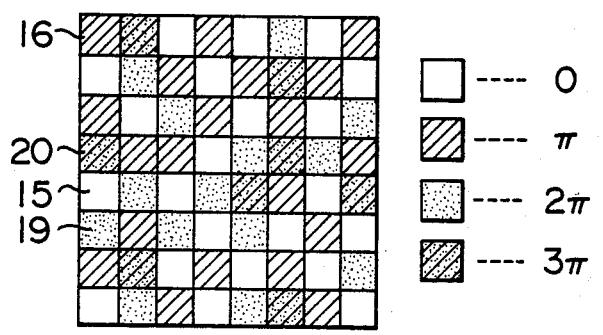
FIG. 7 is a plan view of the phase shifting plate of FIG. 6.

FIGS. 6 and 7 are a cross-section and a plan of another embodiment of the phase shifting plate employed in the present invention. In order to give variety to phase change, the thickness of the phase-change-giving transparent layer 21 of the embodiment of FIGS. 6 and 7 is changed stepwise as different from those of the embodiments of FIGS. 4 and 5. As shown in FIG. 7, blank regions 15 cause no phase change, hatched regions 16 cause a phase change $\pi$, dotted regions 19 cause a phase change $2\pi$, and combined hatched and dotted regions 20 cause a change $3\pi$, and these regions are so arranged that adjacent regions never cause the same phase change. The amount of the phase change is determined by the thickness of the phase-change-giving transparent layer 21 as shown in FIG. 6. The ratio between the thicknesses corresponding to the amounts of phase change 0, $\pi$, $2\pi$, and $3\pi$ is 0 : 1 : 2 : 3.

The method of fabricating the phase shifting plate of FIGS. 6 and 7 is similar to that of FIG. 4 except that three kinds of masks are successively used for evaporating or etching the phase-change-giving transparent layer 21.

Figure 8:
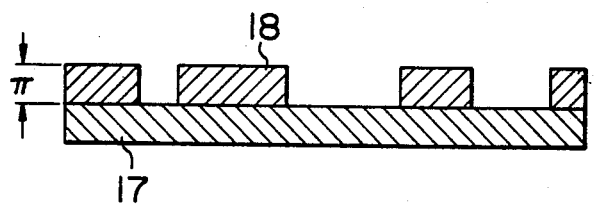
FIG. 8 is a cross-section of a phase shifting plate equivalent to that of FIG. 6.

Here, the phase change $2\pi$ is equivalent to the phase change 0, and the phase change $3\pi$ is equivalent to the phase change $\pi$. Consequently, the embodiment of FIGS. 6 and 7 is equivalent to the phase shifting plate of FIG. 8 with respect to the phase of light, that is, the randomness of phase is maintained while maintaining elemental square profile.

As described above, in order that adjacent unit regions never cause the same phase change the boundary between any adjacent unit regions is stepped in the phase shifting plate of FIGS. 6 and 7. Thus, the phase shifting plate is formed in a tessellated pattern of phase. Consequently, in an image reconstructed from a picture hologram made by the use of this phase shifting plate regularly arrayed tessellated dark fringes appear correspondingly to the regularly arrayed tessellated phase distribution pattern of the phase shifting plate. When the dark fringes appearing in the reconstructed image are distributed at random, they are apt to be easily perceptible as background noise to degrade the quality of the image because a plurality of unit forms collectively form a pattern. However, when the dark fringes are in a regularly arrayed tessellated pattern, they are perceptible to improve the quality of the image because they merely form regular noise. If the pitch of the unit pattern is made smaller, the quality of the image is more improved. Ordinarily, a television picture of a high quality is obtained by a sampling at about 500 lines/frame. Consequently, in order to obtain a similar or better quality of picture, it is good to make the relation between the longer side $l$ of the picture information and the pitch P of the phase shifting plate P $\leq l/500$ as described above.

Figure 9A:
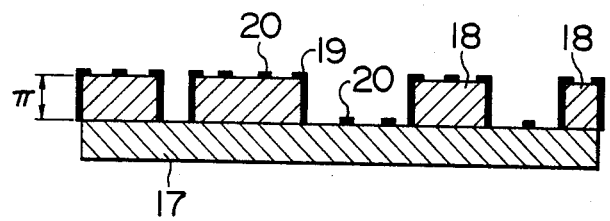
FIGS. 9A, 9B and 9C are cross-sections of other embodiments of the phase shifting plate according to the present invention.
Figure 9B:
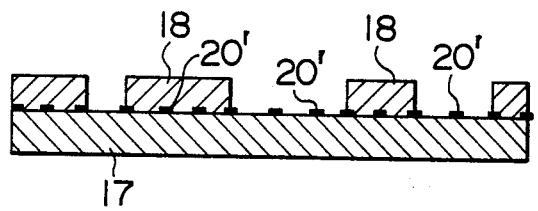
Figure 9C:
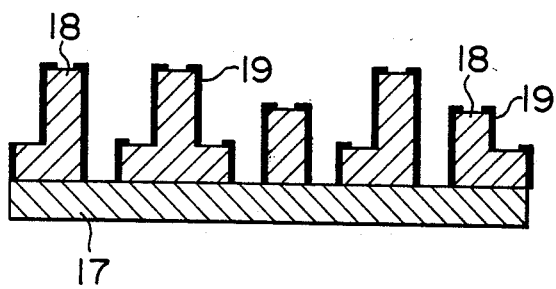

FIGS. 9A, 9B and 9C are cross-sections of other embodiments of the phase shifting plate according to the present invention. In these embodiments, to manufacture random phase shifting plates, a transparent dielectric material 18 having an irregularly and stepwise varying thickness is mounted on a transparent substrate 17 such as a glass plate having a uniform thickness, and an opaque or light absorbing material is provided to boundaries of the transparent dielectric material 18 at which its thickness varies or boundaries of unit phase-change-giving regions. By doing so the disadvantage of the random phase shifting plate, i.e. the speckle noise due to interference between diffracted light produced by the parts of the dielectric material 18 at which the thickness varies discontinuously is prevented while maintaining the sampling function without losing the function of the random phase shifting plate.

In the phase shifting plate of FIG. 9A, a slim opaque material 20 is provided to the upper surface of the islands of the dielectric material 18 and the substrate 17 between the islands of the dielectric material 18 at the boundaries of the unit phase-change-giving regions, and the boundaries 19 of the islands are provided with the opaque material. The material 20 may be dispensed with.

In the phase shifting plate of FIG. 9B an opaque material 20' is provided on the upper surface of the substrate 17 in a mesh at the boundaries of the unit phase-change-giving regions. The phase shifting plate has a similar function to that of FIG. 9A.

In the phase shifting plate of FIG. 9C an opaque material is provided on the side surfaces or at the boundary portions of the islands of the dielectric material 18.

What is claimed is:

1. An apparatus for making a Fourier transform hologram, comprising
   a. a light source for producing a coherent light beam;
   b. a source of analog picture information to be recorded as a hologram;
   c. means for directing a part of the light beam to the analog picture information source;
   d. means for causing interference between the output light of the analog picture information source and another part of the light beam on a light sensitive medium; and
   e. a phase shifting plate disposed in the vicinity of the picture information source in which at least two kinds of unit phase-change-giving regions having different thicknesses are distributed irregularly and discontinuously with a pitch lower than the resolution of the human eye on a transparent substrate for varying the phase of the output light of the analog picture information source irregularly.

2. An apparatus for making a Fourier transform hologram according to claim 1, in which the pitch of the unit phase-change-giving regions is not more than 0.1 mm.

3. An apparatus for making a Fourier transform hologram according to claim 1, in which the pitch of the unit phase-change-giving regions is not more than one five-hundredth of the longer side of the effective picture of the reconstructed image.

4. An apparatus for making a Fourier transform hologram according to claim 1, in which the thicknesses of any adjacent unit regions differ stepwise at their boundary.

5. An apparatus for making a Fourier transform hologram according to claim 4, in which the pitch of the unit phase-change-giving regions is not more than 0.1 mm.

6. An apparatus for making a Fourier transform hologram according to claim 5, in which the pitch of the unit phase-change-giving regions is not more than one five-hundredth of the longer side of the effective picture of the reconstructed image.

7. An apparatus for making a Fourier transform hologram according to claim 1, in which boundary portions of the unit phase-change-giving regions are provided with an opaque material.

8. An apparatus for making a Fourier transform hologram according to claim 7, in which the boundary portions are side surfaces.

9. An apparatus for making a Fourier transform hologram according to claim 1, in which an opaque material is provided on the upper surface of the substrate at the positions corresponding to the peripheral portion of each of the unit phase-change-giving regions.

10. In an apparatus for making a Fourier transform hologram including:
    first means for generating a coherent light beam;
    second means for splitting said coherent light beam into an object beam and a reference beam;
    third means, disposed in the path of said object beam, for collimating said object beam;
    a Fourier transform lens for receiving the object beam collimated by said third means and for focussing the collimated object beam on said hologram recording medium;
    a source of analog picture information disposed in the path of said collimated beam; and
    fourth means for directing said reference beam onto said hologram recording medium to interfere with said object beam and form a Fourier transform hologram of said analog picture information on said hologram recording medium;
    the improvement comprising
    a random phase shifting plate, disposed optically in series with said source of analog picture information in the path of said collimated beam, for imparting at least two randomly distributed phase shifts to said object beam, said plate being composed of a plurality of unit phase shifting regions distributed irregularly across said plate, each unit region imparting a substantially constant phase shift thereacross to the beam passing therethrough, and wherein the pitch of each unit region is lower than the resolution of the human eye.

11. The improvement according to claim 10, wherein the pitch of a unit region is no greater than 0.1 mm.

12. The improvement according to claim 10, wherein the pitch of a unit region is no greater than one five-hundredth of the longer side of the effective picture of the reconstructed image.

13. The improvement according to claim 10, wherein said regions are formed of islands of transparent dielectric material of different thickness disposed on a transparent substrate.

14. The improvement according to claim 13, further including opaque material disposed on the edges of said islands where the thickness of the islands change.

15. The improvement according to claim 13, further including opaque material disposed along the edge of each unit region.

* * * * *